United States Patent Office 2,746,303
Patented May 22, 1956

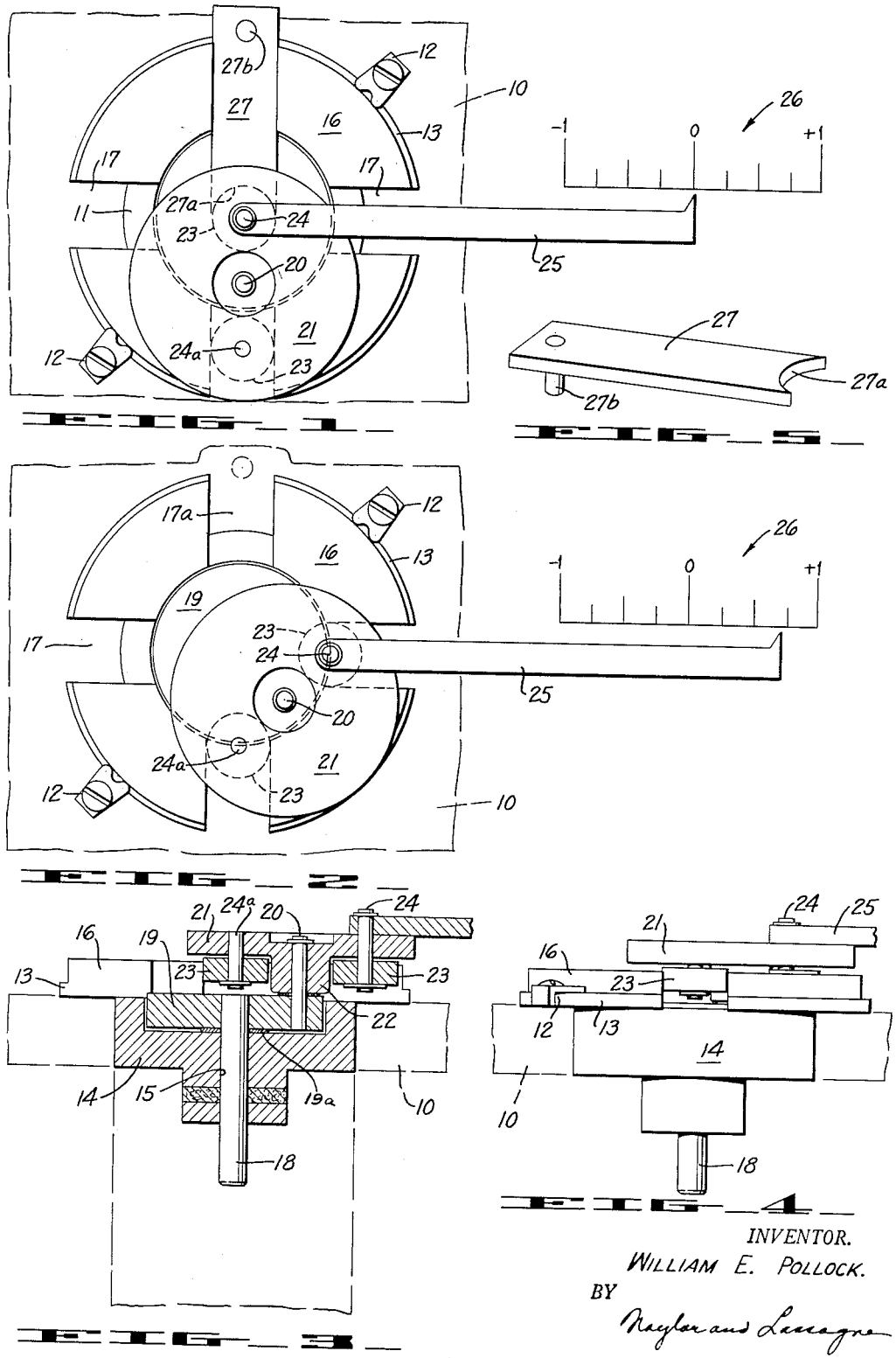

2,746,303

SINE-COSINE MECHANISM

William E. Pollock, Sun Valley Calif., assignor to Librascope, Incorporated, Glendale, Calif., a corporation of California Application February 25, 1952, Serial No. 273,332

5 Claims. (Cl. 74—62)

The present invention relates to analog computers and particularly to devices for converting rotational movements proportional to angular values into linear movements proportional to the sines, cosines or similar functions of such angular values.

Sine-cosine mechanisms in which a toothed pinion gear revolves in mesh with a complementary internal gear of twice the pitch diameter of the pinion are employed as components of many kinds of analog computers. Some degree of unavoidable inaccuracy is present in such mechanisms due to the back-lash inherent in toothed gear drives. Moreover, they are costly to manufacture and assemble.

The principal objects of the present invention are, to provide a sine-cosine mechanism which obviates the use of meshed gears, eliminates back-lash, and employs simple elements inexpensive to manufacture and easy to assemble. Another object is to provide convenient means for accurately "zeroing" the mechanism and temporarily locking it in such position during the process of assembly with other component parts of a computer.

The foregoing objects, together with other advantages apparent from the description to follow, are attained by provision of means for translating rotary into reciprocating movement embodying a trammel type of device constructed and mounted in a novel manner. Also, provision is made for receiving a simple locking bar that serves to center or "zero" the reciprocating indicator arm prior to assembly and operation.

A preferred embodiment of the invention is hereinafter described and claimed and is illustrated in the accompanying drawing, where, Figure 1 is a plan view of the structure with parts shown in neutral or "zeroed" position with parts locked;

Fig. 2 is a similar view with the parts shown in positions assumed during operation;

Figure 3 is a vertical section with parts shown at one extreme position;

Figure 4 is a view in side elevation, the parts in the Figure 2 position; and

Figure 5 is a detail perspective view of the locking element or bar seen in locking position in Figure 1.

In the embodiment illustrated, 10 indicates a mounting panel to which the base member 11 of the device is secured as by clips 12 screwed to the panel. A marginal flange 13 of reduced thickness is preferably provided on the base member for engagement by the clips.

The base proper consists of a central cup-like portion 14 formed with a central bearing 15 and a circumferential radially extending flange or plate portion 16. The flange portion 16 is formed with diametrically extending slots 17, 17a the longitudinal axes of which intersect at right angles on the axis of the bearing opening 15. The bearing opening 15 receives an input or drive shaft 18 the end of which has fixed to it an input disk or member 19 which fits within the cup-like portion of the base and is rotatable therein. Disk 19 is spaced axially of drive shaft 18 from the cup-like portion 14 of the base by means such as a washer 19a.

The input member 19 carries an eccentrically positioned pivot pin 20 on which there is centrally journaled the output disk or member 21. An integral sleeve 22 forming a boss on the underside of disk 21 constitutes the journal bearing for pin 20 and serves to position the disk 21 just above the level of the slotted flange 16. At opposite sides of sleeve 22 on the underside of disk 21, there are journaled, equidistantly from the axis of shaft 20, two tracking rollers 23 on pivot pins 24 and 24a in disk 21. The respective rollers 23 engage the slots 17, 17a and are guided therein during operation of the device. One of the pivot pins, 24, is preferably extended above disk 21 to serve as a pivot for an output arm 25 the index end of which is illustrated as moving over an appropriate scale 26. In a complex computer, however, it would ordinarily be connected to a related computing device.

In order to produce an output of sine or cosine of the angle through which the input shaft 18 is rotated, the pivot pins 24 and 24a of rollers 23 must have their respective centers located at the same distance from the center of pin 20 as separates the axis of pin 20 from the axis of input shaft 18. With such arrangement of the parts above described, the linear output transmitted to the output bar 25 will be proportional to the sine or cosine of the angle through which shaft 18 is rotated. For instance, starting with pin 24, on which the output arm 25 is pivoted, at its center position in which its center is axially aligned with the center of shaft 18, in which position the index end of the arm 25 is shown at zero on the scale, rotation of shaft 18 through 90 degrees will move said pin 24 to one extremity of slot 17. During these movements the value of the function changes from zero to one; that is, the relative position of said pin 24 along slot 17 at all angular positions of shaft 18 is proportional to the sine of the angle through which shaft 18 has rotated away from starting position. At the same time the linear position of the other pin 24a along its slot 17a will be proportional to the cosine of the same angle, and an output arm connected to it and extending normal to arm 25 will register the cosine.

In order to lock the mechanism against operation and zero the output bar when desirable, as when mounting the device, a locking and centering bar 27 is provided which is proportioned to fit in the end portions of either of the slots 17, 17a. This bar has a concave end 27a corresponding to the curvature of the rollers 23. Its other end preferably carries a fixed pin 27b positioned to register with a complemental hole in the mounting panel 10. With this bar in position shown in Figure 1 the mechanism is locked and the roller having the same pivot as that of indicator arm 25 can be held at center with the mechanism in zeroed position.

The invention is characterized by novel adaptation of a simple and comparatively inexpensive mechanical principle producing much greater accuracy in the results obtained than in the previously known types of computing devices employing gearing with accompanying back-lash. It also provides a device which can easily be zeroed and locked for purposes of assembly in a computer.

What is claimed is:

1. In a sine-cosine mechanism, a base member comprising a circular cup-like housing formed with a central bearing and having a circumferential flange extending radially from the upper edge of the housing, said flange being formed with two diametrically extending guide slots intersecting at right angles at the axis of the central bearing, an input shaft journaled at one end in said bearing, an input disk fixed to said end and rotatable within said housing, an eccentric pivot pin on the upper side of said disk, an output disk journaled on said pin and carrying rollers journaled on its under side thereof at either side of the axis of said output disk and each positioned to travel in one of said intersecting slots, an output pin on said output disk positioned on the axis of one of said rollers, an output arm connected to said output pin for linear movement, the axes of said rollers being spaced from the axis of the output disk at distances respectively equal to that between the axis of the input shaft and the output disk, and means associated with said circumferential flange for permitting the rotational adjustment of said guide slots independently of movement of said input shaft.

2. In a sine-cosine mechanism, a base member comprising a circular cup-like housing formed with a central bearing and having a circumferential flange extending radially from the upper edge of the housing, said flange being formed with two diametrically extending guide slots intersecting at right angles at the axis of the central bearing, an input shaft journaled at one end in said bearing, an input member fixed to said shaft for rotary movement within the housing, an output member journaled on said input member on an axis eccentric to that of the input shaft and positioned above the housing, rollers journaled on the under side of said output member at either side of its axis and respectively positioned to travel in one of said intersecting slots, an output arm connected to the output member on a pivot coaxial with one of said rollers, the axes of said rollers being spaced from the axis of the output member at distances respectively equal to that between the axis of the input shaft and the output member, and releasable locking means associated with said flange for permitting the rotational adjustment of the position of said guide slots independently of the position of said input shaft.

3. In a sine-cosine mechanism, a base member, an input member rotatably mounted on said base, an output member rotatably mounted on said input member on an axis parallel to and offset from the axis of said input member, a tracking member mounted at each side of the axis of said output member spaced therefrom a distance equal to that between the axes of the input and output members, a guide member carried by the base formed with two guide slots intersecting at right angles on the axis of said input member and respectively guiding one of said tracking members, a locking and centering member insertable in one of said slots and having a concave end adapted to engage congruently with one of said tracking members when the latter is alined with the center of said input member, and means for removably securing said locking and centering member relative to said base member.

4. The combination of claim 3, with an output arm connected to the output member on a pivot coaxial with one of said tracking rollers and extending parallel to the slot in which said roller moves, whereby said arm receives linear movement through rotation of the output member.

5. In a sine-cosine mechanism having a circular cup-like housing constituting a base member and a central bearing, an input member rotatably journaled therein, a circumferential flange extending outwardly from said housing and having formed therein two diametrically extending slots intersecting normally at the axis of said bearing, an eccentric pivot pin carried on said input member, an output member journaled on said pin; a pair of rollers, arranged to travel in said slots, associated with said output member on the opposite side thereof from said pivot pin and disposed at distances therefrom equal to the radius of rotation of said pivot pin about the axis of said input member; an output pin forming an extension of the axis of one of said rollers, an output arm connected to said output pin for linear movement, and means associated with said base for removably inserting a locking and centering bar to engage one of said rollers for alining said mechanism in the zero position, releasable locking means associated with said circumferential flange arranged to permit rotational adjustment thereof without interference with the rotational position of said input member.

References Cited in the file of this patent

UNITED STATES PATENTS

| | | |
|---|---|---|
| 80,001 | Morris | July 14, 1868 |
| 358,529 | Barr | Mar. 1, 1887 |
| 486,055 | Saladee | Nov. 8, 1892 |
| 1,199,398 | Loftus | Sept. 26, 1916 |
| 2,166,975 | Sologaistoa | July 25, 1939 |
| 2,312,668 | Newton | Mar. 2, 1943 |
| 2,329,743 | Cameron | Sept. 21, 1943 |
| 2,360,762 | Conrad | Oct. 17, 1944 |

FOREIGN PATENTS

| | | |
|---|---|---|
| 447,604 | Italy | Apr. 23, 1949 |